Jan. 14, 1941.  R. G. GUTHRIE  2,228,564
HEAT TREATING FURNACE
Filed Aug. 4, 1939  2 Sheets-Sheet 1
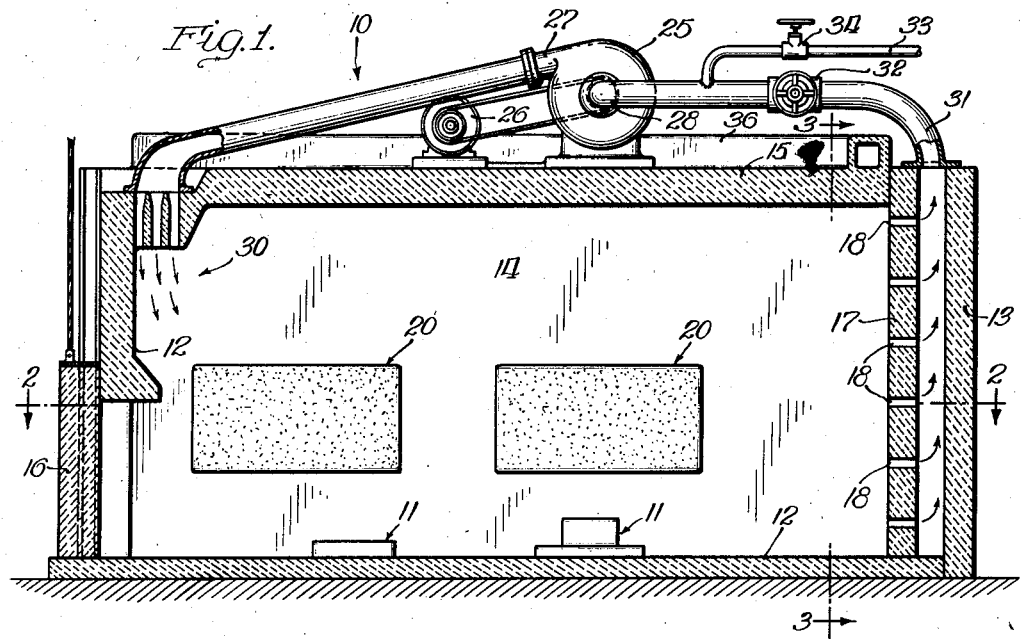
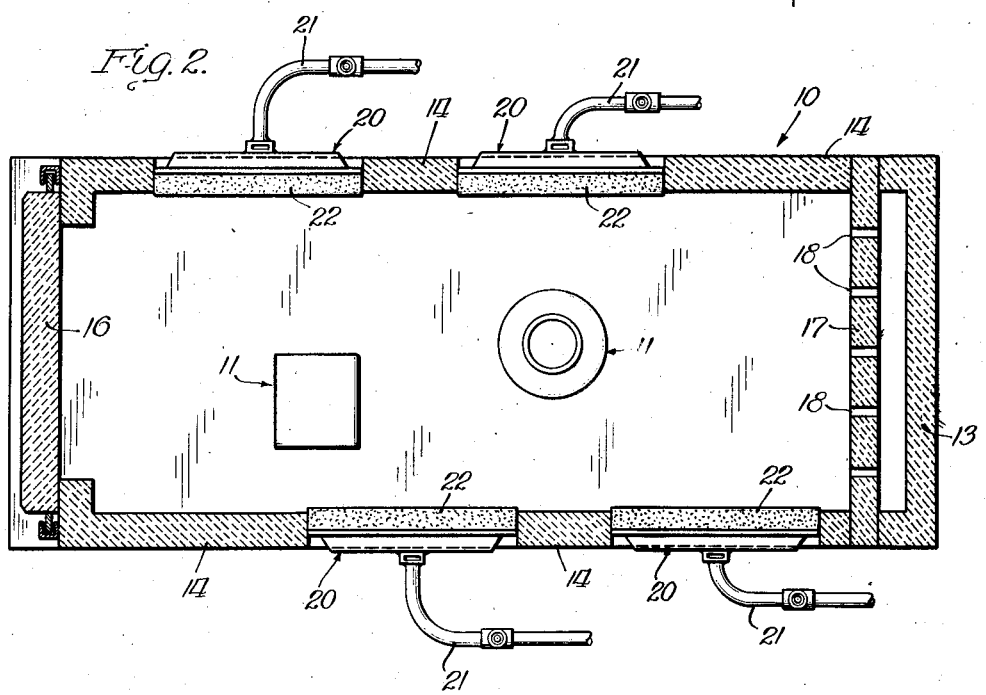
INVENTOR.
Robert G. Guthrie
BY
ATTORNEYS.

Jan. 14, 1941.   R. G. GUTHRIE   2,228,564
HEAT TREATING FURNACE
Filed Aug. 4, 1939   2 Sheets-Sheet 2
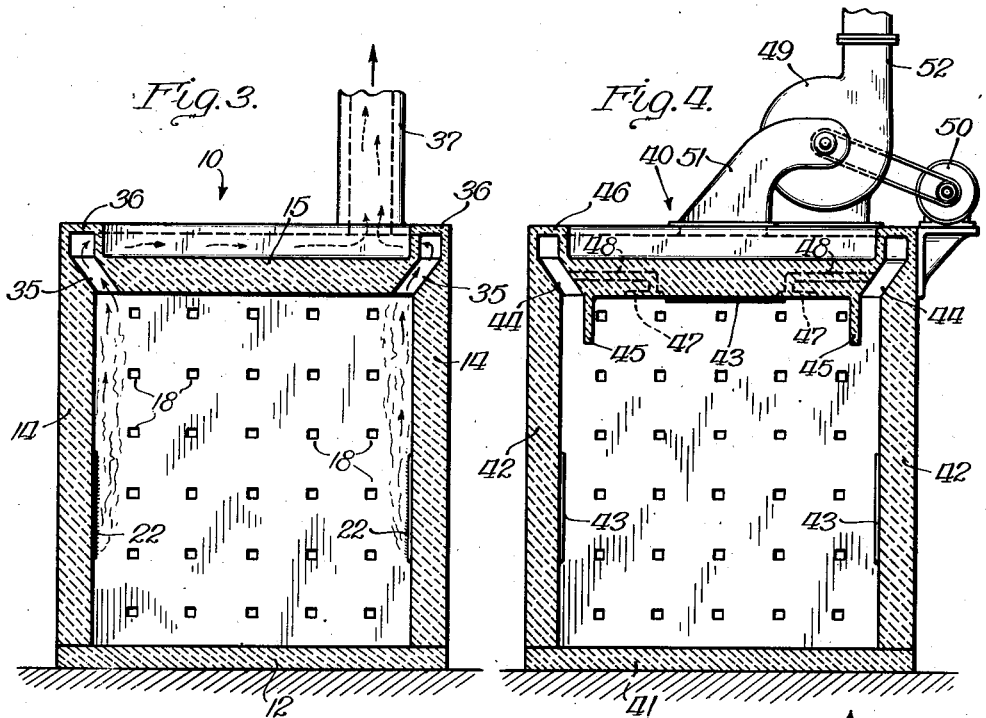
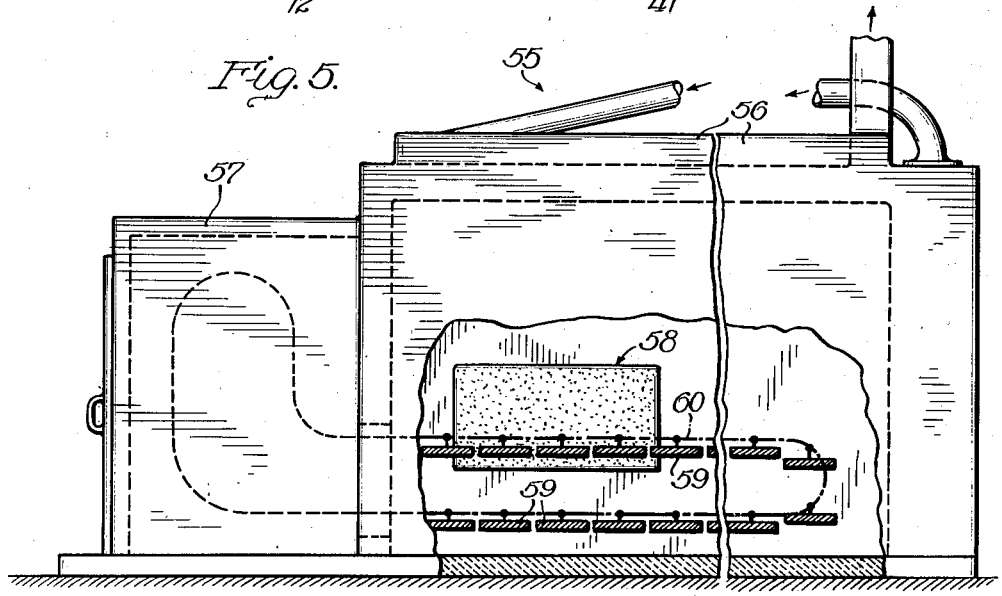
INVENTOR.
Robert G. Guthrie
ATTORNEYS.

Patented Jan. 14, 1941

2,228,564

UNITED STATES PATENT OFFICE 2,228,564

HEAT TREATING FURNACE

Robert G. Guthrie, Chicago, Ill., assignor to Chicago By-Products Corporation, a corporation of Illinois Application August 4, 1939, Serial No. 288,303

2 Claims. (Cl. 266—5)

My invention relates, generally, to furnaces in which metal may be heat treated, and it particularly provides a heat treating furnace wherein the metal to be heat treated is openly exposed to the interior of the furnace and is continuously surrounded or bathed in an atmosphere of controlled composition without the provision of muffles to keep the burner gases from the metal.

Metals, such as steel, are heat treated at high temperatures in atmospheres of controlled compositions to give desired properties to the metal. Heat treating is a general term used in the art to include carburization, decarburization, bright annealing, and other like metal treatments. For the different types of heat treatment, the metal must be disposed in atmospheres of various closely controlled compositions. Such atmospheres are usually made up of gases such as nitrogen, hydrogen, carbon monoxide, carbon dioxide, and traces of other gases. By using different proportions of these gases, atmospheres are made up for different types of heat treatment. The various types of atmospheres used are well understood in the art and need not be further described as their particular compositions are not part of the present invention.

For successful heat treatment, two conditions must be maintained. First, the metal to be heat treated must be maintained at a high temperature, and, second, the metal must be exposed to the proper atmosphere of controlled composition. Heretofore, it has been necessary to place the metal to be heat treated inside of muffles which are placed in a furnace in order to keep the burner gases from contaminating the controlled atmospheres and contacting the metal. The desired atmosphere is continuously passed through the muffles. In this way the combustion gases from the furnace burners do not contaminate the controlled atmospheres. This is very important, since material contamination of these atmospheres would adversely affect the heat treating effect. The muffle material becomes heated to high temperatures from exposure to the furnace interior and the metal in turn receives its heat from the hot muffle.

Various muffle materials are now used such as nickel-chromium alloys and various high grade steels. It has been found that the heat treating is hastened and promoted at elevated temperatures. Accordingly, the industry is heat treating at higher and higher temperatures in order to step up production. At the high temperatures used, and especially at the even higher ones nowadays being demanded, the muffles rapidly deteriorate. That is, they are said to burn out. It will be seen, then, that it would be very desirable to be able to heat treat metals in furnaces without the use of muffles.

An important object of my invention is to heat treat metals openly in a furnace at high temperatures in an atmosphere of controlled composition, without being placed within muffles.

Another very important object of my invention is to provide a heat treating furnace wherein metal to be heat treated may be openly placed within the furnace through which an atmosphere of controlled composition is passed, the combustion gases from the furnace burners being removed before mixing with or contaminating the main body of the atmosphere passing through the furnace.

Another very important object of my invention is to heat a heat treating furnace with surface combustion burners having the burner combustion products removed directly from the burner surface without shooting out into the furnace interior, the furnace heating being obtained by radiation from an incandescent burner surface.

Still another important object of my invention is to provide a metal heat treating furnace through which an atmosphere of controlled composition may be continuously circulated without being objectionably contaminated with the products of combustion from burners for heating the furnace.

Other objects of my invention will, in part, be obvious and in part appear hereinafter.

Accordingly, my invention is disclosed in the embodiments thereof shown in the accompanying drawings, and it comprises the features of construction, the combination of elements and arrangement of parts which will be exemplified in the constructions hereinafter set forth, and the scope of the application of which will be indicated in the appended claims.

For a more complete understanding of the nature and scope of my invention reference may be had to the following detailed description, taken in connection with the accompanying drawings, in which:

Figure 1 is a side view in vertical section of a heat treating furnace illustrating one embodiment of my invention adapted for batch or intermittent operation;

Figure 2 is a sectional view taken on line 2—2 of Figure 1;

Figure 3 is a vertical sectional view taken on line 3—3 of Figure 1;

Figure 4 is a vertical sectional view like Figure 3 of another embodiment of my invention; and Figure 5 is a side elevational view of another embodiment of my invention showing a heat treating furnace adapted for continuous operation, part of the furnace being broken away to show its interior.

Referring now to Figures 1 and 2 of the drawings, a furnace is shown generally at 10 in which work 11 may be heat treated. The furnace 10 comprises a front wall 12, a rear wall 13, side walls 14, and a roof 15. A vertically sliding door 16 is provided as shown for closing the front of the furnace. A wall 17 is spaced from the rear wall 13, having ports 18 provided therein.

With a view to heating the furnace 10 and the work 11 by radiation without objectional contamination by combustion gases, burners 20 of the surface combustion type are provided in the side walls 14 as shown. The burners 20 may be fed from fuel supply lines 21. The burner heads 22 are of a construction whereby true surface combustion may be obtained. The principle of surface combustion is well understood in the art. Generally stated, it is obtained by breaking up a combustible gas mixture into a multitude of fine streams or currents by passing through a porous burner head. What may be termed "point combustion" is obtained at the burner surface, and the burner surface becomes heated to incandescence. After passing through the burner heads 22, the velocity of the gases is small, which prevents them from flowing far into the chamber of the furnace 10. The burner heads 22 may be of several different types. Refractory porous block make one very suitable type of burner head 22. The porosity might be obtained by drilling a multitude of very small holes in a refractory block, or a block may be made up having combustible material incorporated therein and having this material burned out to leave very small pores or holes. Still another type of burner head 22 may be made by packing crystals of high melting point, such as zirconium silcate, into layers of desired thickness. The interstices between the crystals provided the small passageways for fine pores.

As pointed out above, it is necessary in heat treatment that the work 11 be subjected to an atmosphere of controlled composition according to whatever type of heat treating is being carried out in the furnace 10. To accomplish this, a blower 25 may be provided driven by a motor 26 for circulating atmosphere of controlled composition through the furnace 10. The blower 25 is provided with a discharge 27 and an intake 28. The atmosphere is discharged into the upper front end of the furnace 10 as indicated at 30, and sweeps down over the work 11, and out the back of the furnace 10 through the ports 18 in the wall 17. The atmosphere is drawn off from the back of the furnace 10 through a pipe 31 and drawn into the blower 25 through the intake 28 to be discharged again through the discharge 27. In this manner the work 11 is continuously bathed or exposed to the desired atmosphere. A control valve 32 may be provided in the pipe 31 to regulate the flow of the atmosphere. An atmosphere make up line 33 may be connected with the pipe 31 as shown with a shut-off valve 34 provided therein. The composition of the atmosphere circulated through the furnace 10 by the blower 25 may be controlled by addition, from time to time, of the desired gas constituents from the atmosphere make up line 33.

It will be understood that the atmosphere may be circulated through the furnace 10 in any desired direction. That is, it can be forced through the furnace 10 by the blower 25 from rear to front, instead of from front to rear, as shown in the drawings.

With a view of ascertaining the manner in which the combustion gases from the burners 20 are taken off, reference may now be had to Figure 3 of the drawings. Offtake vents 35 are provided for discharging into flues 36 running longitudinally along each side of the furnace 10 and across the back, as shown. A stack 37 (not shown in Figure 1 of the drawings) is provided to draw off the combustion gases from the flues 36. The combustion gases rise along the side walls 14, as illustrated, and pass through the offtake vents 35 into the flues 36, and are discharged through the stack 37.

The burner heads 22 may be recessed in the side walls 14 or roof 15 with an open-sided flue leading therefrom into the off-take vents 35. Also, if desired, off-take vents may lead off just above the tops of the burner heads 22 through the side walls 14. Other various arrangements may be used to take off the burner combustion gases before they contaminate the circulating atmosphere.

In operation, the surfaces of the burner heads 22 become heated to incandescence whereby the furnace 10 and the work are heated substantially entirely by radiation. The controlled atmosphere passes continuously over the work 11 as described above, while the combustion gases rise along the side walls 14 and are taken off through the stack 37. The controlled atmosphere is preferably maintained at a pressure somewhat above atmospheric so that small amounts may diffuse through the furnace 10 or be carried off with the products of combustion. By thus losing slight amounts of the atmosphere it is more perfectly prevented from being contaminated. The circulation of the atmosphere at such a slight excess pressure, and having the combustion gases rising along the side walls 14, prevent the main body of the atmosphere from becoming contaminated with the combustion gases and leakage from the outside. Thus, the work 11 may be openly heated treated in the furnace 10 without the provision of the usual muffles.

Referring now to Figure 4 of the drawings, a furnace is shown generally at 40 substantially of the construction of furnace 10, but somewhat modified. The furnace 40 comprises a floor 41 and side walls 42 having surface combustion burners 43 placed therein. In addition, a surface combustion burner 43 is also provided in the roof of the furnace 40. Combustion gases from the burners 43 and the side walls 42 are taken off through the offtake vents 44 between the side walls 42 and the depending baffles 45 into the flues 46. Combustion gases from the top burner 43 surrounded by a shallow recess or socket 47 are drawn into the flues 46 through the connecting flues 48. The combustion gases are drawn off from the flues 46 by an exhaust fan 49 driven by a motor 50, as shown. The intake 51 of the exhaust fan 49 is connected with the flues 46, and the combustion gases are discharged from the exhaust fan 49 through the discharge 52. The degree of suction for removing the combustion gases may be controlled by regulation of the exhaust fan 49 as desired. The operation of the furnace 40 is essentially the same as that of the furnace 10 of Figures 1, 2, and 3 of the drawings.

With a view of illustrating the adaptation of my invention to a continuously operating furnace, reference may now be had to Figure 5 of the drawings showing such a continuous furnace generally at 55. The continuous furnace 55 comprises a main furnace body 56 with a loading and removal chamber 57 communicating therewith. The main furnace body 56 may be heated by surface combustion burners 58 just as furnaces 10 and 40 of Figures 1, 2, 3, and 4 of the drawings are likewise heated by surface combustion burners. Work 59 to be heat treated is carried by a conveyor 60 through the furnace 55. Various types of conveyors or pushers may be used depending on furnace design and the type of work to be heat treated. For example, the work may be pushed through the furnace 40, from end to end, on trays carried on small trucks or dollies. An atmosphere of controlled composition is continuously circulated through the furnace body 56 and the combustion gases from the burners 58 are removed just as the atmospheres were circulated and the combustion gases removed in connection with furnaces 10 and 40 of Figures 1, 2, 3, and 4.

It will be understood that my invention may be adapted to many types of furnace designs other than those shown in the drawings, the principle being the same. Various types of surface combustion burners may be used and these may be disposed in each particular different position in the interior of the furnace depending on design.

Since certain further changes may be made in the foregoing constructions, and different embodiments of the invention may be made without departing from the scope thereof, it is intended that all matter shown in the accompanying drawings or described hereinbefore shall be interpreted as illustrative and not in a limiting sense.

I claim as my invention:

1. A heat treating furnace comprising an oblong closed chamber having side walls of greater length than the end walls, the side walls containing one or more burner elements, said burner elements consisting of surface combustion units having incandescent faces exposed to project radiant heat inwardly toward the center of the furnace, means for supplying a combustible gas and air mixture to the burner elements to maintain combustion in said units, the products of combustion being discharged from said faces of the units into the furnace, and rising along the side walls, the furnace having outlet openings substantially directly above each of the burner elements for evacuation of the products of combustion, means for supplying an artificial controlled atmosphere to the furnace independently of the burner elements, a part of which artificial atmosphere escapes through said outlet openings with the products of combustion, and means for circulating said artificial atmosphere through the furnace.

2. A heat treating furnace comprising an oblong closed heat treating chamber, said chamber having side walls of greater length than the end walls, the side walls having one or more surface combustion burner elements having faces adapted to be brought to incandescence, said faces being exposed and directed to project radiant heat toward the central part of the furnace chamber where the products to be heated are adapted to be disposed, means for supplying a combustible gas and air mixture to the burner elements to maintain the faces of said surface combustion elements at incandescence to promote the emission of radiant heat, the products of combustion of said units being discharged from said exposed faces of the units into the furnace and rising along the side walls, the furnace having outlet openings above the burner elements to evacuate the products of combustion from the burner rising along the sides of the chamber, and means for supplying a continuous flow of gas independent of said products of combustion longitudinally of the chamber between said upwardly flowing streams of products of combustion of said burners, said flow of gas constituting an artificial controlled atmosphere for occupying the central part of said chamber independent of said products of combustion, a part of said artificial atmosphere escaping through each of said outlet openings with the products of combustion.

ROBERT G. GUTHRIE.